United States Patent
Tracy et al.

(10) Patent No.: US 8,526,179 B2
(45) Date of Patent: Sep. 3, 2013

(54) LAPTOP COMPUTER USER THERMAL ISOLATION APPARATUS

(75) Inventors: Mark S. Tracy, Houstin, TX (US); Britt C. Ashcraft, Houston, TX (US); Jeffrey A. Lev, Houston, TX (US); Paul N. Walker, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 236 days.

(21) Appl. No.: 13/139,165

(22) PCT Filed: Dec. 11, 2008

(86) PCT No.: PCT/US2008/086457
§ 371 (c)(1),
(2), (4) Date: Jun. 10, 2011

(87) PCT Pub. No.: WO2010/068211
PCT Pub. Date: Jun. 17, 2010

(65) Prior Publication Data
US 2011/0242757 A1    Oct. 6, 2011

(51) Int. Cl.
*G06F 1/16*    (2006.01)
*H05K 7/20*    (2006.01)

(52) U.S. Cl.
USPC ............ 361/679.55; 361/679.48; 361/679.49; 361/679.54; 361/704; 165/80.3; 165/104.33; 174/50; 174/50.54; 174/520

(58) Field of Classification Search
USPC .......... 361/679.46, 679.54, 679.55, 690–694, 361/704–714, 831; 174/50, 50.52, 520, 35 R, 174/35 MS; 312/223.2, 223.3; 165/80.3, 165/104.33, 185
See application file for complete search history.

(56) References Cited

U.S. PATENT DOCUMENTS

| | | | |
|---|---|---|---|
| 5,045,971 A * | 9/1991 | Ono et al. | 361/704 |
| 5,107,649 A * | 4/1992 | Benson et al. | 52/309.4 |
| 5,313,362 A | 5/1994 | Hatada et al. | |
| 6,055,156 A | 4/2000 | Von Gutfeld | |
| 6,317,321 B1 * | 11/2001 | Fitch et al. | 361/700 |
| 6,333,847 B1 | 12/2001 | Katsui et al. | |
| 6,418,017 B1 * | 7/2002 | Patel et al. | 361/700 |
| 6,428,886 B1 * | 8/2002 | Lewis et al. | 428/332 |
| 6,466,438 B1 | 10/2002 | Lim | |
| 6,577,502 B1 | 6/2003 | DiStefano et al. | |
| 6,625,024 B2 * | 9/2003 | Mermet-Guyennet | 361/700 |
| 6,775,135 B2 | 8/2004 | Lo | |
| 6,819,559 B1 * | 11/2004 | Seeger et al. | 361/679.46 |
| 6,859,364 B2 | 2/2005 | Yuasa et al. | |
| 6,938,968 B2 * | 9/2005 | Tanimoto et al. | 312/406 |
| 6,980,418 B1 * | 12/2005 | Seeger et al. | 361/679.54 |
| 7,161,799 B2 | 1/2007 | Lim et al. | |
| 7,729,108 B2 * | 6/2010 | Rehmann et al. | 361/679.09 |
| 2003/0157284 A1 * | 8/2003 | Tanimoto et al. | 428/36.1 |
| 2004/0240164 A1 * | 12/2004 | Lee | 361/683 |
| 2005/0270746 A1 | 12/2005 | Reis | |
| 2008/0112130 A1 | 5/2008 | Nakamura | |

OTHER PUBLICATIONS

International Searchng Authority, International Search Report and Written Opinion, Appln No. PCT/US2008/086457, date of mailing Aug. 3, 2009, pp. 10.

* cited by examiner

*Primary Examiner* — Michail V Datskovskiy

(57) ABSTRACT

A laptop computer user thermal isolation apparatus is provided for inhibiting the transfer of waste heat from internal heat generating components to a user. The thermal isolation apparatus includes a casing substantially enclosing the heat generating components, the casing including at least one panel having a sealed enclosed cavity disposed between the heat generating components and an outer surface of the casing.

20 Claims, 2 Drawing Sheets

LAPTOP COMPUTER USER THERMAL ISOLATION APPARATUS

BACKGROUND

Laptop computers include densely packed circuitry, high density hard drives, and internal other components, all of which generate heat during operation of the computer. Because this heat is not useful for the operation of the computer, it can be considered to be waste heat. Many cooling mechanisms are available to remove or dissipate waste heat from the computer, or to mitigate the effects of waste heat on the operation of the computer components. Such cooling mechanisms include fans, heat pipes, heat sinks, and thermal spreaders. These cooling mechanisms can remove heat generally from the entire computer casing, or can be specially designed to remove heat from particular components, including the CPU, GPU, power supply, and hard drive. As long as these components are kept below their thermal rating for operation, the computer functions properly.

However, because the components of the computer often have thermal ratings well above ambient temperature (i.e., higher than about 70 degrees Fahrenheit), residual waste heat not removed by the cooling mechanisms is often transferred to the user via radiation, convection, and conduction from the heat generating components to the casing of the computer, and then usually by conduction or convention to the lap and/or hands of the user, thereby causing discomfort to a user.

Prior attempts to mitigate the discomfort of a user from residual waste heat being transferred to the user's lap from the bottom of the computer casing have involved providing a mechanism for circulating air between the bottom of the computer casing and the lap of a user, and such attempts have often required fans or other active components.

DETAILED DESCRIPTION

In one embodiment of the present invention, a laptop computer user thermal isolation apparatus is provided for inhibiting the transfer of waste heat from internal heat generating components to a user. The thermal isolation apparatus includes a casing substantially enclosing the heat generating components, the casing including at least one panel having a sealed enclosed cavity disposed between the heat generating components and an outer surface of the casing.

In another embodiment of the present invention, a casing substantially enclosing internal heat generating components of a laptop computer is provided for inhibiting the transfer of waste heat from the heat generating components to a user. The casing includes a base panel having a sealed enclosed cavity disposed between the heat generating components and a bottom surface of the casing on which the weight of the computer is supported during use of the computer, and a palm rest panel having one or more sealed enclosed cavities disposed between the heat generating components and one or more respective palm rest surfaces on which a user's hands may be supported during use of the computer.

In yet another embodiment of the present invention, a method is provided for inhibiting the transfer of waste heat from internal heat generating components in a laptop computer to a user. The method includes providing a computer casing panel including an enclosed cavity disposed between the heat generating components and an outer surface of the computer.

Figure 1:
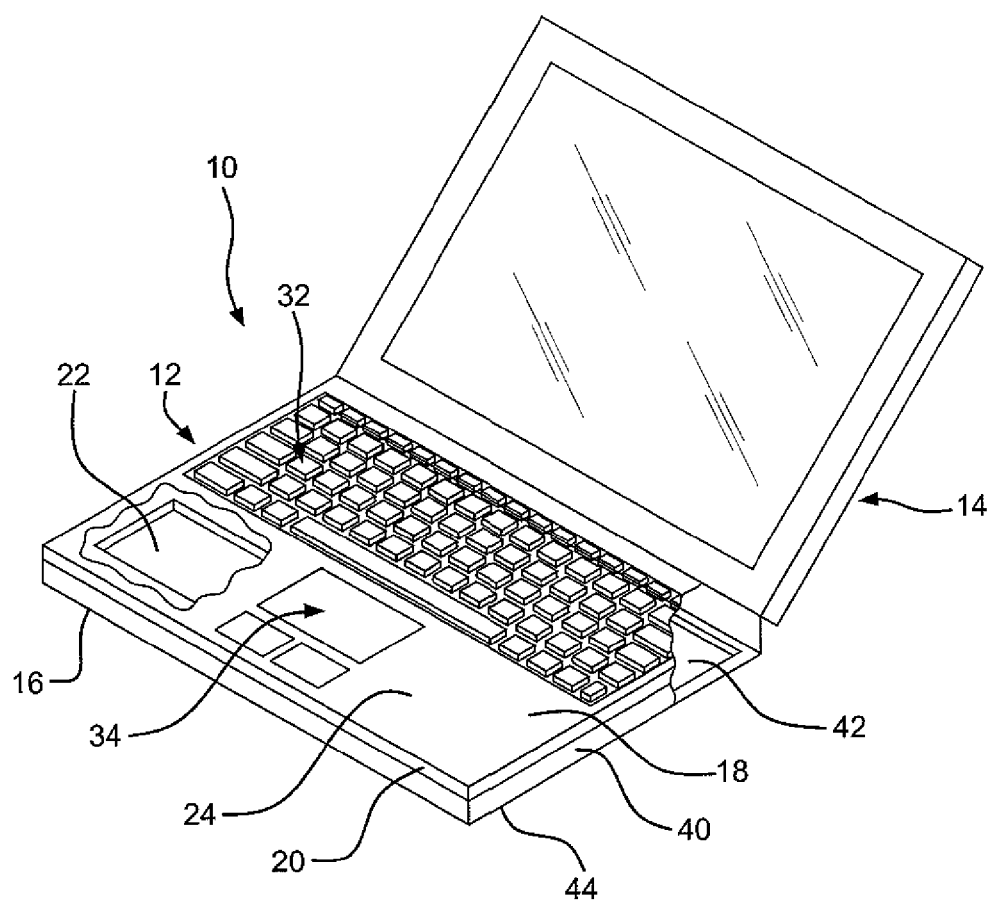
FIG. 1 is a perspective view of a laptop computer with partial cutaways depicting an embodiment of a user thermal isolation apparatus.
Figure 2:
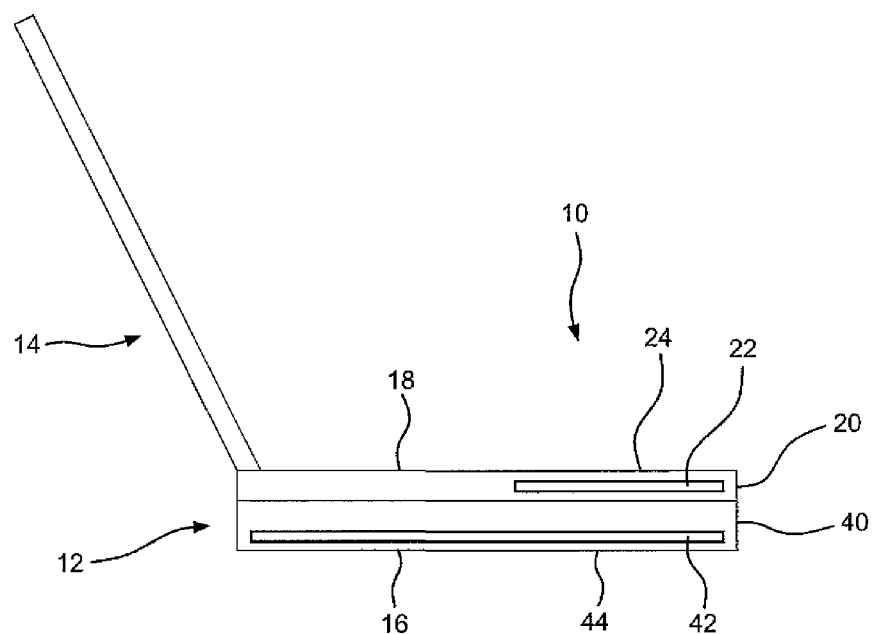
FIG. 2 is a side cross-sectional view of a laptop computer depicting an embodiment of a user thermal isolation apparatus.

There is shown in FIGS. 1 and 2 a laptop computer 10 (also known as a notebook computer). The laptop computer 10 includes a casing 12 and a display 14 hingedly attached along a rear edge of the casing 12. The casing 12 substantially encloses internal heat generating components (not shown) of the computer 10, including but not limited to a CPU, RAM, ROM, a hard disk drive, and various other chips for driving the display 14, Ethernet or modem connections, USB connections, and other functions of the computer 10. Standard cooling mechanisms can be provided for cooling each of the heat generating components individually, or for cooling the heat generating components in combination. Nevertheless, because the heat generating components are able to operate at elevated temperatures, the temperature of the internal heat generating components is typically higher than the ambient temperature on the outside of the casing 12.

The casing 12 has a generally downward facing bottom surface 16 on which the weight of the computer 10 is supported when the computer is in use. The computer 10 can be used on a table top or desk top, or, as is commonly done, the computer 10 can be placed on the lap of a user during use such that at least a portion of the bottom surface 16 rests on the legs of a user and the weight of the computer 10 is supported on the user's legs.

The casing 10 includes a base panel 40 disposed generally between the internal heat generating components of the computer 10 and the bottom surface 16 of the casing 10. The base panel 40 includes a first surface 42 comprising at least a portion of the bottom surface 16.

The casing 10 has a top surface 18 oriented opposite the bottom surface 16 such that the top surface 18 faces generally upward away from the table top, desk top, or lap of a user when the computer 10 is in use. A keyboard 32 and a touchpad with buttons 34 are exposed through the top surface 18 to enable a user to operate the computer by interfacing the user with the internal components of the computer 10.

The casing 12 includes a palm rest panel 20 disposed generally between the internal heat generating components of the computer 10 and a portion of the top surface 18. The palm rest panel 20 includes a second surface 22 comprising at least a portion of the top surface 18 on which the hands of a user may be placed during use of the computer. It is common for a user, while accessing the keyboard 34 and or the touchpad with buttons 34, or while viewing the display 14 but not accessing the keyboard 34 or the touchpad with buttons 34, to rest one or both hands on the second surface 22.

When the laptop computer 10 is in use, a portion of the heat generated by the internal heat generating components that is not dissipated by cooling mechanisms, i.e., excess waste heat, is transmitted to the casing 12. Without a thermal isolation apparatus as described below, the excess waste heat would conduct through the base and palm rests of a computer, thereby causing discomfort to a user by uncomfortably heating up a user's lap and hands, respectively. Various embodiments of the present invention provide an entirely passive apparatus, not requiring any moving parts or additional components, for inhibiting the transfer of heat from the internal heat generating components of the computer 10 to the lap or hands of a user.

In one embodiment of the present invention, the base panel 40 of the casing 12 includes an enclosed cavity 42. The enclosed cavity 42 is fully enclosed and sealed within the base panel 40, so that air from outside the casing 12 cannot flow into or out of the cavity 42. The cavity 42 extends across a portion of the base panel 40 generally parallel to the bottom surface 16. The portion of the base panel 40 across which the cavity 42 extends can be nearly the entire panel 40 (except for small portions around the edges needed to maintain the cavity 42 sealed from the outside). Alternatively, the portion of the base panel 40 across which the cavity 42 extends can include one or more strips extending in a front to rear direction with respect to the computer 10, or one or more strips extending in a left to right direction with respect to the computer, or a combination thereof. In general, the fewer conduction paths for heat transfer that remain in the base panel 40, the less heat will be transferred to the bottom surface 16 and hence to the lap of a user.

The enclosed cavity 42 need only be of sufficient height to create a gap over which heat cannot be readily conducted or convected. For example, the gap, i.e., the height of the cavity 42, can be as small as about 1 mm and as large as would be permitted within the physical constraints of the casing 12. The enclosed cavity 42 is preferably filed with a gas. In one embodiment, the gas is air. In another embodiment, the gas is a gas having a lower thermal conductivity than that of air, such as one of the gases that can be used in double pane or triple pane insulated windows. In yet another embodiment, the gas is at about 1 atmosphere pressure. In still another embodiment, the cavity 42 is at least partially evacuated (similarly to the space in between walls of a thermos bottle) so that the pressure of the gas in the cavity is less than about 1 atmosphere pressure.

The enclosed cavity 42 can be formed by any methods known in the art. Casings 12 of laptop computers 10 are commonly made from a plastic material. Accordingly, the enclosed cavity 42 can be formed in the base panel 40 by injection molding. Preferably, the enclosed cavity 42 is formed by a process of gas assisted injection molding, in which an amount of molten plastic less than that required to fill the mold is provided, and gas is injected into the center of the molten plastic to force the plastic to the walls of the mold to form the outer contours of the base panel 40, thereby creating the internal cavity 42. An advantage of gas assisted injection molding is the elimination of sink marks in the external surface of the base panel 40.

In another embodiment of the present invention, the palm rest panel 20 of the casing 12 includes one or more enclosed cavities 22. Each enclosed cavity 22 is fully enclosed and sealed within the palm rest panel 20, so that air from outside the casing 12 cannot flow into or out of the cavity 22. Each cavity 22 extends across a portion of the palm rest panel 20 generally parallel to the top surface 18. The portion of the palm rest panel 20 across which the cavity 22 extends can be nearly the entire panel 20 not consumed by the keyboard 32 and the touchpad with buttons 34 (and except for small portions around the edges needed to maintain the cavity 22 sealed from the outside). Preferably, the palm rest panel 20 includes two cavities 22, one disposed on either side of the touchpad with buttons 34 and in front of the keyboard 32 (i.e., on the opposite site of the keyboard 32 from the display 14), corresponding to the locations where a user would commonly rest one or both of his or her hands when operating the computer 10. Preferably, each of the two cavities 22 on either side of the touchpad with buttons 34 covers as much of the area as possible where the hands of a user might rest, because in general, the fewer conduction paths for heat transfer that are left in the palm rest panel 20, the less heat will be transferred to the top surface 18 and hence to the hands of a user.

Each enclosed cavity 22 need only be of sufficient height to create a gap over which heat cannot be readily conducted or convected. For example, the gap, i.e., the height of the cavity 22, can be as small as about 1 mm and as large as would be permitted within the physical constraints of the casing 12. The enclosed cavity 22 is preferably filed with a gas. In one embodiment, the gas is air. In another embodiment, the gas is a gas having a lower thermal conductivity than that of air, such as one of the gases that can be used in double pane or triple pane insulated windows. In yet another embodiment, the gas is at about 1 atmosphere pressure. In still another embodiment, the cavity 22 is at least partially evacuated (similarly to the space in between walls of a thermos bottle) so that the pressure of the gas in the cavity is less than about 1 atmosphere pressure.

The enclosed cavity 22 can be formed by any methods known in the art. Casings 12 of laptop computers 10 are commonly made from a plastic material. Accordingly, the enclosed cavity 22 can be formed in the base panel 40 by injection molding. Preferably, the enclosed cavity 22 is formed by a process of gas assisted injection molding, in which an amount of molten plastic less than that required to fill the mold is provided, and gas is injected into the center of the molten plastic to force the plastic to the walls of the mold to form the outer contours of the palm rest panel 20, thereby creating the internal cavity 22. An advantage of gas assisted injection molding is the elimination of sink marks in the external surface of the palm rest panel 20.

What is claimed is:

1. A laptop computer user thermal isolation apparatus for inhibiting the transfer of waste heat from internal heat generating components to a user, comprising:
a casing substantially enclosing the heat generating components, the casing including at least one panel having a sealed cavity disposed between the heat generating components and an outer surface of the casing, wherein the at least one panel comprises a single continuous cavity extending from a first outermost sidewall of the casing to a second outermost sidewall of the casing opposite the first outermost sidewall.

2. The user thermal isolation apparatus of claim 1, wherein the sealed cavity is filled with a gas.

3. The user thermal isolation apparatus of claim 2, wherein the gas is air.

4. The user thermal isolation apparatus of claim 2, wherein the gas is a gas having a thermal conductivity lower than that of air.

5. The user thermal isolation apparatus of claim 1, wherein the sealed cavity is at about 1 atmosphere pressure.

6. The user thermal isolation apparatus of claim 1, wherein the sealed cavity is evacuated to a pressure lower than about 1 atmosphere pressure.

7. The user thermal isolation apparatus of claim 1, wherein the at least one panel comprises a base panel disposed between the heat generating components and at least a portion of a bottom outer surface of the casing, wherein the bottom outer surface of the casing is provided for supporting the weight of computer during use of the computer.

8. The user thermal isolation apparatus of claim 1, wherein the at least one panel comprises a palm rest panel disposed between the heat generating components and at least a portion of a top outer surface of the casing, wherein the top outer surface of the casing is provided for supporting the hands of a user during use of the computer.

9. The user thermal isolation apparatus of claim 1, wherein the at least one panel having a sealed cavity is formed by gas assisted injection molding.

10. A casing substantially enclosing internal heat generating components of a laptop computer for inhibiting the transfer of waste heat from the heat generating components to a user, comprising:
   a base panel having an enclosed single continuous cavity disposed between the heat generating components and a bottom surface of the casing on which the weight of the computer is supported during use of the computer; and
   a palm rest panel having one or more enclosed cavities disposed between the heat generating components and one or more respective palm rest surfaces on which a user's hands may be supported during use of the computer.

11. The casing of claim 10, wherein the enclosed cavity of the base panel and the one or more enclosed cavities of the palm rest panel are filled with air.

12. The casing of claim 10, wherein the enclosed cavity of the base panel and the one or more enclosed cavities of the palm rest panel are at about 1 atmosphere pressure.

13. The casing of claim 10, wherein the enclosed cavity of the base panel and the one or more enclosed cavities of the palm rest panel are evacuated to a pressure lower than about 1 atmosphere pressure.

14. The casing of claim 10, wherein the enclosed cavity of the base panel and the one or more enclosed cavities of the palm rest panel are formed into the base casing panel and the palm rest panel by gas assisted injection molding.

15. A method of inhibiting the transfer of waste heat from internal heat generating components in a laptop computer to a user, comprising:
   gas injection molding a computer casing panel including an enclosed cavity disposed between the heat generating components and an outer surface of the computer.

16. The method of claim 15, wherein the casing panel is a base panel and the outer surface of the computer is at least a portion of a bottom surface of the computer on which the weight of the computer is supported during use of the computer.

17. The method of claim 15, wherein the casing panel is a palm rest panel and the outer surface of the computer is at least a portion of a palm rest surface of the computer on which the hands of a user can be supported during use of the computer.

18. The user thermal isolation apparatus of claim 8 further comprising a touchpad, wherein the palm rest panel comprises:
   a first continuous cavity extending from the first outer sidewall of the casing to a first side of the touchpad; and
   a second continuous cavity extending from a second side of the touchpad to the second outer sidewall of the casing.

19. The user thermal isolation apparatus of claim 10 further comprising a touchpad, wherein the palm rest panel comprises:
   a first continuous cavity extending from a first outermost sidewall of the casing to a first side of the touchpad; and
   a second continuous cavity extending from a second side of the touchpad to a second outermost sidewall of the casing.

20. The user thermal isolation apparatus of claim 19, wherein the base panel comprises a single continuous cavity extending from the first outermost sidewall of the casing to the second outermost sidewall of the casing opposite the first outermost sidewall.

* * * * *